United States Patent [19]
Crowe et al.

[11] Patent Number: 6,115,460
[45] Date of Patent: Sep. 5, 2000

[54] CALL REDIRECTION SYSTEM

[75] Inventors: Donald Edward Crowe, Morris Plains, N.J.; James Patrick Dunn, Northville Township, La Salle County, Ill.; Kimerie Walzer Javitt, Hillside, N.J.; Hoo-Yin Khoe, Morris Plains, N.J.; Daniel Nash Utberg, Randolph, N.J.

[73] Assignee: Lucent Technologies Inc., Murray Hill, N.J.

[21] Appl. No.: 08/885,540

[22] Filed: Jun. 30, 1997

[51] Int. Cl.[7] .................................................. H04M 3/42
[52] U.S. Cl. .......................... 379/211; 379/219; 379/900; 379/133; 370/352
[58] Field of Search ..................................... 379/219, 220, 379/221, 229, 230, 243, 133, 134, 900, 211, 207, 212, 111, 112, 113; 370/352, 908, 909, 910, 911

[56] References Cited

U.S. PATENT DOCUMENTS

| | | | |
|---|---|---|---|
| 5,610,910 | 3/1997 | Focsaneanu et al. | 370/351 |
| 5,708,702 | 1/1998 | De Paul et al. | 379/230 |
| 5,761,274 | 6/1998 | Uehara et al. | 379/230 |
| 5,764,744 | 6/1998 | Mizuma et al. | 379/207 |
| 5,949,871 | 9/1999 | Kabay et al. | 379/229 |

FOREIGN PATENT DOCUMENTS

| | | | |
|---|---|---|---|
| 2228189 | 1/1998 | Canada | H04Q 3/18 |
| 0 711 052 A1 | 10/1995 | United Kingdom | H04L 12/02 |
| WO 96/11551 | 4/1996 | United Kingdom | H04Q 3/00 |

OTHER PUBLICATIONS

"Virtual Private Network Call Processing In The Intelligent Network", by Mohamed Atoui, *Supercomm/ICC* Jun. 14, 1992, vol. 2 of 4, pp. 0562–0565.

"An Overview of PSTN Data Off–Load Issues and Alternatives Using GR–303 Access Systems", by Rob Bond, *Bellcore* GR–303 Industry Forum, Orlando FL, May 8, 1997 pp. 1–23.

"An Overview of PSTN Data Off–Load Approaches Using GR–303 Access Systems", by Rob Bond, *Belcore* Jun. 1997, pp. 1–26.

"Meeting Notes From the Orlando GR–303 Industry Forum", *Bellcore* May 8 and 9, 1997 pp. 1–15.

"Proposal: 7303DR GR303 Requirements Extension: Internet Detour Product: Broadband Access Network Design & Engineering" *Belcore* Proposal: 7303DR. Jun. 10, 1997 pp. 1–3.

*Primary Examiner*—Krista Zele
*Assistant Examiner*—Benny Q. Tieu
*Attorney, Agent, or Firm*—Claude R. Narcisse

[57] ABSTRACT

A remote call redirection system located within a local access network which directs data traffic destined for the Internet to a channel connected directly to the Internet thereby reducing congestion within the local access network due to data traffic destined for the Internet.

13 Claims, 2 Drawing Sheets

CALL REDIRECTION SYSTEM

FIELD OF THE INVENTION

This invention relates to local access networks and more particularly to a device and method for redirecting information traffic in local access networks.

DESCRIPTION OF THE RELATED ART

Telephone subscribers gain access to the Public Switched Telephone Network (PSTN) through local access networks provided by local and regional phone companies. The PSTN is a telephony network which is accessible to the public. A local access network is an interconnection of various local access network equipment which allow telephone subscribers to gain access to telephony networks such as the PSTN, computer communication networks such as the public Internet, corporate communication networks, educational communication networks, governmental communication networks and other communication networks.

An example of a typical local access network is shown in FIG. 1. The network depicted in FIG. 1 comprises local access network equipment such as remote terminal (RT) 112 and Switch 116 connected to each other via communication link 114. RT 112, which can be located anywhere between the subscriber equipment and Switch 116, is connected to subscriber equipment (telephone 100, facsimile 102, terminal adapter 104, modem 105) via communication links 106, 108, 110 and 111 commonly referred to as local loops. The actual media used to implement the local loops as well as communication link 114 can be pairs of metallic wires, e.g., tip/ring (T/R) pairs, coaxial cables, fiber optic cables, air, or any other medium through which electrical, electromagnetic and or optical signals can be conveyed.

For the sake of clarity, only four subscriber equipment and their corresponding local loops are shown. In an actual local access network, there may be hundreds of subscriber equipment connected to a plurality of remote terminals via hundreds of local loops. The subscriber equipment can be any communication device (e.g., telephone, modem, terminal adapter, computer) that can communicate with a local access network via a local loop.

The subscriber equipment and the remote terminals communicate with each other with the use of information. The information can represent voice communications signals, facsimile signals, video signals or any other type of information signals conveyed in local access networks. The information signals can be implemented as digital signals, optical signals, analog signals or any other type of electrical or optical signal typically used in local access networks.

The information is formatted, packaged and conveyed via the local loops in accordance with a protocol. The protocol is a set of rules and standards by which network equipment and the subscriber equipment initiate communication, engage in communication and terminate communication. For example, many local access networks in North America comply with the well known TR 303 protocol. The information conveyed between the remote terminals and the Switch are packaged or structured in accordance with well defined communication channel formats. For example, many local access networks comply with the well known Digital Signal Zero (DS0) format which specifies the logical communication channel structure used in the networks. A DS0 channel is defined as a communication channel with an information capacity of 64 kbps (64,000 bits per second). Part of the information conveyed through a DS0 channel represents protocol information. For example, in the TR 303 protocol, the information is packaged as frames where each frame contains 24 words where each word is 8 bits long. For every sixth frame the least significant bit of each word is used as a signaling bit; this technique is known as robbed bit signaling. Other techniques can be used whereby part of the information conveyed through the DS0 channel represents protocol information.

In addition to complying with the local access network protocol, many of the subscriber equipment (e.g., terminal adapter 104) also follow global protocols such as the Integrated Services Digital Networks (ISDN) protocol. The ISDN contains a limited set of standard interfaces for digital communications networks. The ISDN was established by the CCITT (Comite Consultatif International Telegraphique et Telephonique ) or International Telegraph and Telephone Consultative Committee to allow digital communications networks world wide to be able to communicate with each other. For example, terminal adapter 104 can be an ISDN terminal adapter (also called an "ISDN modem") that communicates with the ISDN and thus follows the protocols and standards established for the ISDN. ISDN subscriber equipment use a communication channel logical structure called a Basic Rate Interface (BRI). The Basic Rate Interface, which is also called a 2B+D interface, is a communication channel with a capacity of 144 kbps corresponding to two "B" channels each having a capacity of 64 kbps and a "D" channel with a capacity of 16 kbps. The "B" channels are typically used to convey information but may also be used to convey protocol information; the "D" channel is typically used to convey protocol information. Thus, if terminal adapter 104 is an "ISDN modem", the logical channel structure within local loop 110 used for conveying information signals and protocol information between terminal adapter 104 and RT 112 would be a BRI channel.

RT 112 formats and packages the information along with protocol information to comply with the communication channel formats used in some of the local loops and in communication link 114. Communication link 114 is typically a high capacity communication channel through which information and protocol information are conveyed between RT 112 and Switch 116. For example, communication link 114 can be formatted in accordance with the Digital Signal One (DS1) format, the OC3 format, the DS1 format packaged as per the PRI channel structure, or any other format used for high capacity channels. The DS1 format is defined as a channel consisting of 24 DS0 channels. Part of the DS1 channel is commonly called an overhead channel (e.g. a DS0 channel); the overhead channel is used to convey protocol information. The PRI (Primary Rate Interface) channel structure is typically used in networks having ISDN equipment. PRI is an ISDN channel format in which there are 23 "B" channels for conveying information and 1 "D" channel for conveying protocol information. The B and the D channels each has an information capacity of 64 kbps. The OC3 format is defined as a communication channel with a capacity of 155 Mbps. Typically, the OC3 format is used in fiber optic communication networks such as SONET (Synchronous Optical Network).

RT 112 directs information and protocol information received from subscriber equipment through available channels of communication link 114. Typically, Switch 116 receives the protocol information via a channel (e.g., the overhead channel, a DS0 channel reserved by Switch 116) within communication link 114 specifically reserved for conveying only protocol information. Switch 116 is connected to the communication networks (Private Network 125, PSTN 126, Public Internet 128) via network communication links 117, 118 and 120. Each of the network communication links provides an interface to the networks. The interface comprises a channel used to convey protocol information and a plurality of information channels. For example, network communication link 120 can be structured as per the PRI channel structure. Thus, the D channel of communication link 120 would be the protocol interface for that link and is used to convey only protocol information while the remaining 23 "B" channels would be used to convey information. An example of a protocol used between Switch 116 and ISP POP is the well known Q.931 protocol. The network communication links can also be structured as per the DS1 format, the OC3 format or any other format used for high capacity communication links.

Still referring to FIG. 1, network communication link 120 is connected to ISP POP 122 which is connected to Public Internet 128 via communication link 124. An ISP POP (Internet Service Provider Point Of Presence) is either a commercial, educational or governmental entity which has its own data communications equipment (e.g. modems, terminal adapters, switches/routers) connected to the local access network equipment (typically Switch 116) and is interfaced to a plurality of world wide computer communications networks such as Public Internet 128. ISP POP 122 comprises various data communications equipment (not shown) that process incoming information and protocol information and transfers them to Public Internet 128 via communication link 124. ISP POP 122 also transfers information signals and protocol information to Switch 116 via communication link 120.

Network communication link 117 is connected to Data Communication equipment 121 which is connected to Private Network 125 via communication link 119. Data Communication equipment 121 comprise various data communications equipment owned by an entity (e.g., a university, a corporation, a governmental agency) that allows access to Private Network 125. Private Network 125 can be any computer communication network such as a corporate network, a government network or an educational network. Communication links 117, 118, 119, 120 and 124 can be implemented with any type of media such as fiber optic cables, coaxial cables, hybrid fiber coax cable systems, wireless links, T1 lines or any other high capacity links.

In accordance with the protocol (e.g., TR 303) being followed by the local access network, Switch 116 processes received protocol information and information signals, generates corresponding protocol information and transfers such protocol information along with the received information to their proper destination (i.e., Public Internet 128, PSTN 126 or to subscriber equipment via RT 112). Part of the protocol information received and processed by Switch 116 is signaling information that enables Switch 116 to determine whether information received from the subscribers should be directed to PSTN 126, to Public Internet 128 or to Private Network 125.

When one of the subscribers initiates a call, there are various protocol information signals that are generated by the subscriber equipment, RT 112 and Switch 116. A call is defined as at least two communication devices (e.g., modems, telephones, facsimile, computers) within a communication network which are connected to each other such that they communicate information and protocol information to each other in accordance with a protocol. Switch 116 receives and transmits protocol information associated with the call to properly regulate the call. Switch 116 regulates the call by processing protocol information associated with the call and recording part of that information for billing purposes. Part of the protocol information processed by Switch 116 is called signaling information. The signaling information is used by Switch 116 to detect when a call is being initiated or when an ongoing call has been terminated. For example, the telephone numbers dialed by a calling subscriber generate dialing signals representing digits which are received by Switch 116. Switch 116 not only processes these digits but stores them for billing purposes. The dialed digits allow Switch 116 to decide where to direct the call, i.e., which channel within network communication link 117, 118 or 120 is to be allocated for the call.

Switch 116 can contain a list (or have access to a list) of telephone numbers categorized as data call numbers or Voice Frequency (VF) call numbers. Thus, a call can be categorized as a data call or a VF call. Depending on the number of different types of communication networks accessible from the local access network of FIG. 1, there can be other categories in addition to data calls and VF calls.

A VF call is a telephone call destined for a telephony network such as PSTN 126 and typically involves voice communications between telephone users through the use of telephone handsets (e.g., corded telephone handsets, cordless telephones, wireless or cellular telephones). The information associated with the call is conveyed via a local loop through RT 112 and through a channel (e.g., a DS0 channel) within communication link 114. Switch 116 would typically direct the VF call to PSTN 126, i.e., allocate a channel (e.g. a DS0 channel) within network communication link 118 for such a call. A telephony network may also provide services for facsimile communications, video communications and other types of communications. A data call is a telephone call destined for a computer communication network such as Public Internet 128 or Private Network 125. Typically, such a call involves digital communication between two computers that are part of a computer communication network either through the use of modems or terminal adapters or any other communication device that transmits and receives digital information.

Because of the emergence of the Internet and other computer communication networks in terms of world wide public usage, the number of calls and their duration that have to be processed by the local access network equipment has been steadily increasing. In many local access networks such as the one shown in FIG. 1, the Switch may not be able to handle the increased traffic. For some networks, the rise in information traffic due to subscribers attempting to gain access to the Internet and other networks is fast approaching the capacity of Switch 116.

The inability of Switch 116 to accommodate the subscriber calls and provide subscribers access to PSTN 126, Public Internet 128, Private Network 125 or any other network connected to the local access network due to information traffic is defined as congestion. It is reasonably anticipated that, in some cases, the capacity of Switch 116 will be severely strained or even surpassed. There have already been cases in which congestion of information traffic at Switch 116 has occurred resulting in many subscribers not being able to successfully make a telephone call or gain access to Public Internet 128. In particular, because of a great amount of telephone calls for Internet usage, congestion develops at Switch 116 preventing Switch 116 from providing customers access to either PSTN 126, Public Internet 128 or Private Network 125. Congestion also occurs when there are no available channels to which Switch 116 can direct a call. In such a circumstance, a customer receives a busy tone or a message from Internet software residing in the subscriber's equipment advising that access to the Internet is temporarily not possible.

One attempt at reducing the congestion at the Switch is simply to increase the capacity of the remote terminals by adding more DS1 channels and deploying more switching capacity to handle the increased traffic. Accordingly, the ISPs must add an increasing number of DS1/PRI channels between the Switch and the ISP POP. This solution is not only expensive but may not efficiently address the problem of ever increasing data traffic due to Internet usage by subscribers.

Another proposed solution is to co-locate some of the equipment (modem pool, Switch/Router) from ISP POP 122 with Switch 116. The information traffic leaving the data equipment can then be statistically multiplexed greatly reducing the channel capacity required by the ISP. While this is an effective short term solution because the greatest congestion will occur at the channels between the Switch and the ISP POP, it does not resolve the congestion in the Switch itself and therefore may still require that the local access network provider deploy more switches and communication channels.

Still another solution proposes to separate, at the remote terminal, the voice traffic and other traffic destined for the PSTN from traffic destined for other communication networks such as the Internet. The traffic destined for the Internet is bypassed to channels that are connected directly to the ISP POP and thus are never received by the Switch. Although this solution has the effect of relieving congestion at the Switch, it requires that the Remote Terminal contain the necessary mechanism to determine whether an incoming call is data traffic destined for a data network such as the Internet. Such a Remote Terminal would require a significant upgrade from existing Remote Terminals that would be costly and require substantial development time. An additional shortcoming of this solution is that since the bypass is performed at the RT, the Switch has no knowledge of the call; this complicates billing and other processing functions normally performed by the Switch.

Therefore, there is a need for a system and method for reducing congestion in a local access network due to the increased demand by subscribers to have access to communication networks interfaced to the local access network.

There is also a need for a system and method for reducing congestion in a local access network that uses the existing local access network equipment without substantial modification of such equipment.

SUMMARY OF THE INVENTION

The present invention provides for a call redirection system and method for reducing congestion in a local access network. Different types of calls initiated by subscribers connected to the local access network are redirected to their destination bypassing part of the local access network equipment thus substantially reducing congestion in the local access network. The redirected call is regulated by local access network equipment.

The call redirection system comprises a Processing module which has access to stored data and is configured to receive protocol information associated with a call by a subscriber equipment. The Processing module generates a direction message based on the protocol information and the stored data. The call redirection system further comprises a Direction module which is configured to redirect calls from the subscriber equipment. The Direction module is further configured to receive the direction message from the Processing module and redirect the call so as to reduce congestion in accordance with the direction message and allow local access network equipment to regulate the redirected call.

DETAILED DESCRIPTION

Figure 1:
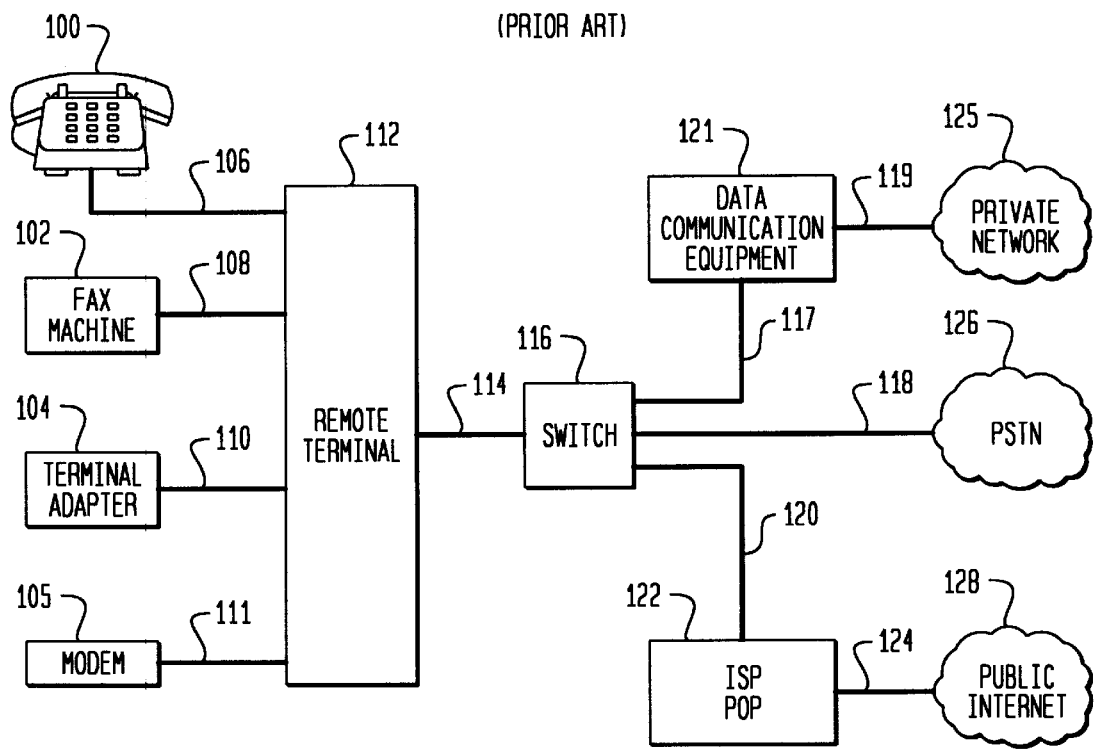
FIG. 1 is a prior art local access network configuration.
Figure 2:
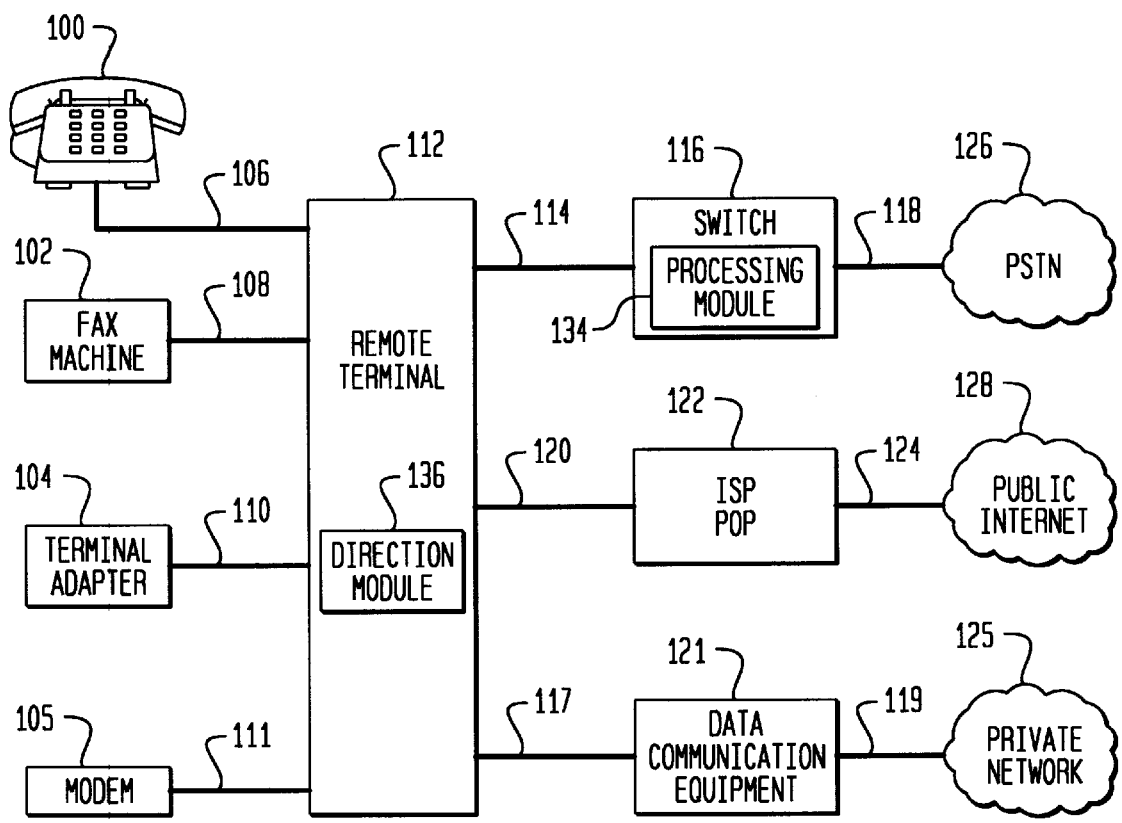
FIG. 2 is a local access network configuration similar to that of FIG. 1 which includes the system of the present invention.

FIG. 2 shows the configuration of a local access network within which the call redirection system of the present invention is situated. The call redirection system comprises Processing module 134 and Direction module 136. Processing module 136, which has access to stored data and protocol information generates a direction message based on the protocol information associated with a call and the stored data. Processing module transmits the direction message via a channel within communication link 114 to Direction module 136 instructing Direction module 136 whether to redirect the call to Public Internet 128 via network communication link 120, or Private Network 125 via network communication link 117. As an example, communication link 114 can be formatted as per the DS1 format and network communication link 117 can be structured as per the PRI channel structure. The protocol information associated with the call is received by Switch 116 via the "D" channel of network communication link 117 or 120 and is allowed by Direction module 136 to be routed through RT 112 to a channel (e.g., a DS0 channel) within communication link 114. Switch 116 transmits protocol information via the same path. The path which connects the protocol interfaces (for links 117 and 120) at RT 112 to Switch 116 is defined as a protocol channel. Each network connected to RT 112 can have its own protocol channel. Thus, the protocol interfaces for network communication links 117 and 120, which are terminated at RT 112, are made accessible to Switch 116 via the protocol channel. In this manner, Switch 116 is still able to regulate calls destined for Public Internet 128 or Private Network 125. However, the information associated with a call destined for Public Internet 128 or Private Network 125 do not flow through Switch 116 but is redirected as per the direction message at RT 112 to either network communication link 120 or 117 substantially reducing congestion at Switch 116.

Still referring to FIG. 2, it will be readily understood by those of ordinary skill in the art to which this invention belongs, that the local access network such as the one depicted in FIG. 2 may comprise any number of subscribers, a plurality of remote terminals and a plurality of switches.

The operation of the present invention is illustrated in the following example. Network communication links 117 and 120, have channel structures as per the PRI structure. Communication link 114 can be configured as per the DS1 format and the protocol being followed by the local access network is the well known TR 303 protocol. Any of the subscribers can initiate calls (e.g., a VF call, a data call) by transmitting the appropriate protocol information to RT 112. In accordance with the TR 303 protocol, when a subscriber initiates a call, the subscriber equipment sends an Off Hook signal to RT 112 indicating that the subscriber wants to gain access to a network, i.e., either PSTN 126, Public Internet 128 or Private Network 125. RT 112 detects the Off Hook signal and sends a corresponding Off Hook TR 303 message to Switch 116. Switch 116 responds with a message instructing RT 112 to allocate a particular channel (e.g., a specific DS0 channel) for the call originated by the subscriber. RT 112 connects the allocated channel to the calling subscriber to allow the information that will be generated by the call to be conveyed through the allocated channel. Switch 116 then sends a Dial Tone signal to RT 112 which transfers such signal to the calling subscriber via the allocated channel. The Dial Tone signal indicates to the subscriber that a channel has been allocated for the call. Upon reception of the Dial Tone signal, the subscriber dials a telephone number. The dialed number may be the telephone number of a party in PSTN 126, Public Internet 128 or Private Network 125.

The dialing of the telephone number causes dialing signals (representing digits) to be transmitted from the subscriber's equipment through RT 112 to Switch 116. Switch 116 collects the digits that have been dialed by the calling subscriber. Switch 116 decides, based on the dialed number and the stored data in a database, whether to redirect the call. That is, if the called number has been categorized in the database as a data call number, then the call is redirected.

As is typically done in a local access network in directing a VF call, Switch 116 directs the call to the appropriate channel within communication link 118 and onto PSTN 126. In particular, when Processing module 134 determines that the call does not require redirection, the call is allowed to continue onto PSTN 126. The information associated with the call flows through Switch 116 and onto PSTN 126 via communication link 118. The protocol information associated with the call flows through a reserved DS0 channel in communication link 114 (or through the overhead channel) through Switch 116 and through a reserved DS0 channel of communication link 118. When the call is terminated by one of the parties, a call termination signal is received by Switch 116. Switch 116 then sends a disconnect message to RT 112 instructing RT 112 to release the channel previously allocated for the now terminated call. The channel is now made available for future calls.

A call is redirected by the system of the present invention in the following manner. Protocol information associated with the call and received by Switch 116 along with stored data allow Processing module 134 to determine that the call is to be redirected. Processing module 134 transmits a direction message to Direction module 136 via a channel (e.g. a DS0 channel) within communication link 114. Direction module 136 is configured to receive such a message. The direction message can be implemented as digital signals, analog signals, optical signals or any other type of electrical or optical signal typically used in local access networks. Upon receiving the direction message, Direction module 136 generates the proper signals to RT 112 instructing RT 112 to redirect the call to a channel (e.g. a "B" channel) within communication link 120 designated by Switch 116. The protocol information associated with the call are conveyed between Switch 116 and ISP POP 122 via a protocol channel. The protocol channel comprises a channel within communication link 114 (e.g., the overhead channel or a DS0 channel reserved by Switch 116) routed through RT 112 and connected to the "D" channel of network communication link 120. Thus, even though the protocol interface for network communication link 120 is located at RT 112, the use of the protocol interface effectively connects the protocol interface to Switch 116. Therefore, Switch 116 regulates the call via the protocol channel in accordance with a protocol (such as the well known Q.931 protocol), but the information associated with the call does not flow through Switch 116 substantially reducing congestion in the local access network and in particular at Switch 116.

Upon termination of the call (e.g., one of the parties goes On Hook), either RT 112 or ISP POP 122 receives a call termination signal (e.g., an On Hook signal) as part of the protocol information. The On Hook signal is relayed to Switch 116 via the protocol channel. Upon receipt of the On Hook signal, Switch 116 sends a message to RT 112 and ISA POP 122 instructing them to release the previously allocated channel making said channel available for future calls.

Similarly, for calls destined for Private Network 125, Direction module 136 instructs RT 112 to redirect the call to network communication link 117. Switch 116 regulates the call via a protocol channel comprising a channel within communication link 114 (e.g., a reserved DS0, the overhead channel) routed through RT 112 and connected to the "D" channel of network communication link 117. Protocol information associated with the call is conveyed via this protocol channel. The information associated with the call flows through one of the "B" channels of network communication link 117.

It should be understood to one of ordinary skill in the art to which this invention belongs that the configuration of the local access network within which the remote call direction system resides is not limited to the configuration shown in FIG. 2. The local access network may be configured in any other manner and with other local access network equipment not shown in FIG. 2. The bypassed calls would be regulated by local access network equipment via a protocol channel. Therefore, depending on the category of a particular call, Processing module 134 would generate a direction message instructing the appropriate network equipment (e.g., a Remote Terminal) to redirect the call to the appropriate network.

Also, there may be additional types of networks connected to the local access network which may be categorized into a plurality of different categories. The number of categories defined would depend on the number of different types of networks being regulated by Switch 116. For example, in addition to VF calls and data calls, Switch 116 can regulate calls conveying video signals that are destined for a video network or a communication network within which video signals are conveyed. In such a situation, the specialized database would include a 'video call' category that would allow Switch 116 to determine whether a call should be redirected to a video network attached to the local access network. Again, in such a case the present invention substantially eliminates congestion at Switch 116 by allowing certain calls such as data calls or video calls to bypass Switch 116 while still allowing Switch 116 to regulate these bypassed calls.

Those of ordinary skill in the art to which this invention belongs will readily understand that the present invention can be implemented with electrical or electronic analog or digital circuitry and integrated within the circuitry of RT 112 and Switch 116. The present invention can also be implemented as firmware or software modules integrated within the software of RT 112 and Switch 116.

We claim:

1. A call redirection system for reducing congestion in a local access network having local access network equipment that regulate calls, the call redirection system comprising:

a Processing module having access to stored data, the Processing module configured to receive protocol information associated with a call, and to generate a direction message based on the received protocol information and the stored data; and a Direction module coupled to the Processing module, the Direction module configured to receive the direction message from the Processing module and cause the call to be redirected so as to reduce congestion in accordance with the direction message and enable the local access network equipment to regulate the redirected call by routing protocol information from a network protocol interface through a protocol channel to the local access network equipment.

2. The call redirection system of claim 1 where the stored database comprising telephone numbers categorized as different types if calls.

3. The call redirection system of claim 1 where the redirected call bypasses the local access network equipment.

4. The call redirection system of claim 1 where the Processing module transmits the direction message via a channel used by the local access network equipment to convey protocol information.

5. The call redirection system of claim 1 where the Processing module communicates with the Direction module via a communication link.

6. The call redirection system of claim 1 where the Processing module is interfaced to local access network equipment.

7. The call redirection system of claim 1 where the Direction module in interfaced to local access network equipment and instructs said local access network equipment to redirect the call in accordance with the direction message.

8. The call redirection system of claim 1 in which the Direction module is coupled to the Processing module via a communication link.

9. The call redirection system of claim 1 in which the equipment that regulate calls comprise a Switch.

10. A method for redirecting a telephone call to reduce congestion in a local access network having local access network equipment that regulate calls, the method comprising the steps of:

receiving, at a processing module and via a protocol channel, protocol information associated with the call;

accessing stored data that categorize telephone numbers;

generating a direction message based on the protocol information and the stored data;

receiving, at a direction module and via the protocol channel, the direction message; and redirecting the call in accordance with the direction message received via the protocol channel so as to reduce congestion in the local access network and to enable the local access network equipment to regulate the redirected call by routine protocol information through the Protocol channel.

11. The method of claim 10 where the step generating the direction message further comprises the step of transmitting the direction message through a protocol channel.

12. The method of claim 10 where the step of redirecting the call further comprises the step of regulating the call.

13. The method of claim 10 where the step of redirecting the call further comprises causing the information associated with the call not to flow through the local access equipment that regulate calls.

* * * * *